US006982073B2

(12) United States Patent
Sabacky et al.

(10) Patent No.: US 6,982,073 B2
(45) Date of Patent: Jan. 3, 2006

(54) PROCESS FOR MAKING NANO-SIZED STABILIZED ZIRCONIA

(75) Inventors: Bruce J. Sabacky, Reno, NV (US); Timothy M. Spitler, Fernley, NV (US)

(73) Assignee: Altair Nanomaterials Inc., Reno, NV (US)

( * ) Notice: Subject to any disclaimer, the term of this patent is extended or adjusted under 35 U.S.C. 154(b) by 231 days.

(21) Appl. No.: 10/053,177

(22) Filed: Nov. 2, 2001

(65) Prior Publication Data

US 2003/0086865 A1 May 8, 2003

(51) Int. Cl.
*C01G 25/02* (2006.01)

(52) U.S. Cl. ..................................................... 423/608
(58) Field of Classification Search .................. 423/608
See application file for complete search history.

(56) References Cited

U.S. PATENT DOCUMENTS

| | | | |
|---|---|---|---|
| 4,012,338 A | | 3/1977 | Urwin |
| 4,065,544 A | | 12/1977 | Hamling et al. |
| 4,639,356 A | | 1/1987 | O'Toole et al. |
| 4,769,351 A | * | 9/1988 | Soumiya et al. ............ 501/105 |
| 4,842,832 A | | 6/1989 | Inoue et al. |
| 4,923,682 A | | 5/1990 | Roberts et al. |
| 4,944,936 A | | 7/1990 | Lawhorne |
| 5,068,056 A | | 11/1991 | Robb |
| 5,141,634 A | * | 8/1992 | Carr et al. ............... 210/198.2 |
| 5,545,468 A | | 8/1996 | Koshiba et al. |
| 5,562,763 A | | 10/1996 | Bruckner et al. |
| 5,660,774 A | | 8/1997 | Stangle et al. |
| 5,698,177 A | | 12/1997 | Pratsinis et al. |
| 5,714,260 A | | 2/1998 | Okuda et al. |
| 5,770,310 A | | 6/1998 | Noguchi et al. |
| 5,840,111 A | | 11/1998 | Wiederhoft et al. |
| 6,001,326 A | | 12/1999 | Kim et al. |
| 6,099,634 A | | 8/2000 | Uenishi et al. |
| 6,376,590 B2 | * | 4/2002 | Kolb et al. ................. 524/413 |

FOREIGN PATENT DOCUMENTS

| | | |
|---|---|---|
| EP | 0 337 472 A | 10/1989 |
| WO | WO 01/00530 A1 | 6/2000 |
| WO | WO 01/00531 A1 | 6/2000 |
| WO | WO 01/12555 A2 | 6/2000 |
| WO | WO 02/20396 A2 | 3/2002 |
| WO | WO 02/32574 A2 | 4/2002 |

OTHER PUBLICATIONS

Changrong, Xia et al., "Sol–gel synthesis of yttria stabilized zirconia membranes through controlled hydrolysis of zirconium alkoxide", *Journal of Membrane Science*, Elsevier Science, Amsterdam, NL, vol. 162, No. 1–2, pp. 181–188, Sep. 1, 1999.

Metelkina, Olga et al., "Effects of the post–synthesis treatment on the structural properties of alumina–doped zirconia", Journal of Non–Crystalline Solids, North–Holland Publishing Company, Amsterdam, NL, vol. 285, No. 1–3, pp. 64–70, Jun., 2001.

Abstract, Japanese Pat. No. JP 9309726A2: Lithium Titanate Hydrate and Its Production; issue date Dec. 2, 1997.

Abstract, Japanese Pat. No. JP 9309727A2: Lithium Titanate, Its Production and Lithium Battery Using The Same; issue date Dec. 2, 1997.

Abstract, Japanese Pat. No. JP 9309728A2: Lithium Titanate, Its Production and Lithium Battery Using The Same; issue date Dec. 2, 1997.

Abstract, Japanese Pat. No. JP 10251020A2: Metal Substituted Lithium Titanate, its Production and Lithium Battery Using the Same; issue date Sep. 22, 1998.

Abstract, Japanese Pat. No. JP 10310428A2: Lithium Titanate Hydrate and Production of Lithium Titanate; issue date Nov. 24, 1998.

Abstract, Japanese Pat. No. JP 20281433A2: Production of Lithium Titanate Minute Sintered Particle; issue date Oct. 10, 2000.

Abstract, Japanese Pat. No. JP 20302547A2: Production of Lithium Titanate, Lithium Ion Battery and Its Negative Electrode; issue date Oct. 31, 2000.

U.S. Appl. No. 60/306,683, filed Jul. 20, 2001 entitled Process for Making Lithium Titanate.

* cited by examiner

*Primary Examiner*—Edward M. Johnson
(74) *Attorney, Agent, or Firm*—Brinks Hofer Gilson & Lione; G. Peter Nichols

(57) ABSTRACT

A process to produce stabilized zirconia from a solution of zirconium salt and a stabilizing agent. The zirconium salt may include zirconium oxysulfate, zirconium oxychloride, zirconium oxynitrate, zirconium nitrate, and other water-soluble zirconium salts. The stabilizing agent may include calcium, magnesium, yttrium salts of oxides and rare earth oxides. The process is conducted by evaporation of the solution above the boiling point of the solution but below the temperature where there is significant crystal growth. The evaporation step is followed by calcination to produce the desired nano-sized structure. Further processing by sintering may be applied to produce solid structures or by milling and classification to produce material for thermal spray coating.

14 Claims, 5 Drawing Sheets

Nano-sized stabilized $ZrO_2$ structure

PROCESS FOR MAKING NANO-SIZED STABILIZED ZIRCONIA

BACKGROUND OF THE INVENTION

The present invention relates to nano-sized stabilized zirconia and, in particular, to an economical method of making nano-sized stabilized zirconia.

Zirconia ($ZrO_2$) exhibits toughness, wear resistance, hardness, low thermal conductivity and other properties that make it useful in numerous industrial applications.

Stabilized zirconia exhibits high fracture toughness, absorbs energy of impact that shatters other ceramics, and can tolerate thermal gradients better than most other high temperature materials. Because of its high oxyanion conductivity at elevated temperatures, stabilized zirconia is also the material of choice for electrolytes in solid-state fuel cells.

There are three commonly occurring and established crystal forms of zirconia: cubic, tetragonal, and monoclinic. The cubic form is the high temperature form and is stable above 2370° C. The tetragonal form is stable between 1170° C. and 2370° C. The monoclinic form is stable below 1170° C. The monoclinic to tetragonal phase change is accompanied by a volume change of about 4%. Cooling from the manufacturing temperature often destroys pure zirconia, or gives it inferior mechanical properties. Therefore, it is desirable to stabilize the zirconia in some fashion.

Several methods have been used to form stabilized zirconia. Generally, a stabilizing agent such as calcium, magnesium, yttrium, cerium, or rare earth oxides is added. Zirconia, structurally stabilized by the addition of calcium, yttrium, magnesium, cerium or rare earth oxides has numerous applications. One important application is the manufacture of oxygen sensors. It is also widely used today both for monolithic components and as a coating over refractory metal alloys to serve as a thermal barrier.

Recent advances have shown the advantages of manufacturing nano-sized stabilized zirconias. Nano-sized stabilized zirconia exhibits several very favorable properties, including significant reduction in sintering temperature and ability to deform superplastically under applied stress. Other enhancements include higher diffusivities and possibly higher ionic conductivities. These advantages play heavily both in the manufacture of solid oxide fuel cells and in producing spray coatings with superior mechanical attributes.

Existing methods to produce nano-sized stabilized zirconium oxide powders include co-precipitation and sol-gel synthesis. Existing gas-phase methods to produce nano-sized stabilized $ZrO_2$ include inert gas condensation and chemical vapor condensation. These methods, however, are not economical to produce the bulk quantities needed for applications such as thermal barrier coatings and solid oxide fuel cells.

U.S. Pat. No. 6,162,530 discloses a process to make nano-sized powders of $ZrO_2$ from aqueous solutions. The disclosed process involves atomizing an aqueous solution of the desired metals in a stream of nitrogen and contacting the resulting particles with a spray of a recirculating aqueous solution at controlled pH. The particles produced by this method consist of nanostructured fibers. Further treatment includes sequential heat treatment, ultrasonication, and spray drying.

Although this process may be simpler and cheaper than the co-precipitation or sol-gel synthesis, the process still requires steps that become expensive and difficult to control when extrapolated to commercial production scale, e.g., the efficient mixing of the atomized particles with the recirculating solution requires a special reactor and filtration of the particles will in practice require cumbersome equipment and produce large streams of waste solutions.

The process of the present invention does not produce fibers but particles of approximately the same size in all three dimensions, and solves the above problems by providing an economical and commercially practical method for making stabilized zirconia.

SUMMARY OF THE INVENTION

The present invention provides a process for the manufacture of nano-sized stabilized zirconia that comprises preparing an aqueous feed solution that contains a zirconium salt and a stabilizing agent, converting the feed solution under controlled conditions to form an intermediate, and calcining the intermediate to form agglomerates of nano-sized particles.

The terms "nano-sized" and "nano-size" as used in the following description and claims are meant to refer to particles having linear dimensions in the range from about 1 nm to about 100 nm.

The evaporation is conducted under conditions to achieve substantially total evaporation and to form an intermediate. In particular, the conversion is conducted at a temperature higher than the boiling point of the feed solution but lower than the temperature where significant crystal growth occurs. The intermediate is generally amorphous. Its X-ray diffraction pattern is a very broad, low intensity peak. In a preferred embodiment, the intensity of the X-ray diffraction peak is no more than 15% of the intensity corresponding to a fully formed crystal. In a particularly preferred embodiment, the intermediate is formed as a thin film and preferably has a shape that is spherical or part of a sphere.

The term "substantially total evaporation" or "substantially complete evaporation" refers to evaporation such that the solid intermediate contains less than 15% free water, preferably less than 10% free water, and more preferably less than 1% free water. The term "free water" is understood and means water that is not chemically bound and can be removed by heating at a temperature below 150° C. After substantially total evaporation or substantially complete evaporation, the intermediate product will have no visible moisture present.

The intermediate product is further calcined at a temperature between 400° C. and 1300° C. and may be milled to liberate the nano-sized particles. The product may be further spray dried and classified to produce agglomerates of nano-sized particles in the desired size range.

DESCRIPTION OF THE INVENTION

It has now been found that nano-sized particles of stabilized $ZrO_2$ can be obtained in an economical manner in a process that includes hydrolysis at a temperature sufficient to insure substantially complete evaporation but low enough to prevent significant crystal growth. The intermediate is generally amorphous. Its X-ray diffraction pattern is a very broad, low-intensity peak. In a preferred embodiment, the intensity of the X-ray diffraction peak is no more than 15% of the intensity corresponding to a fully formed crystal. The process is related to the processes disclosed in U.S. patent applications Ser. Nos. 09/503,365, 09/503,636, and 60/241,041, the entire contents of which are incorporated herein by reference.

Figure 1:
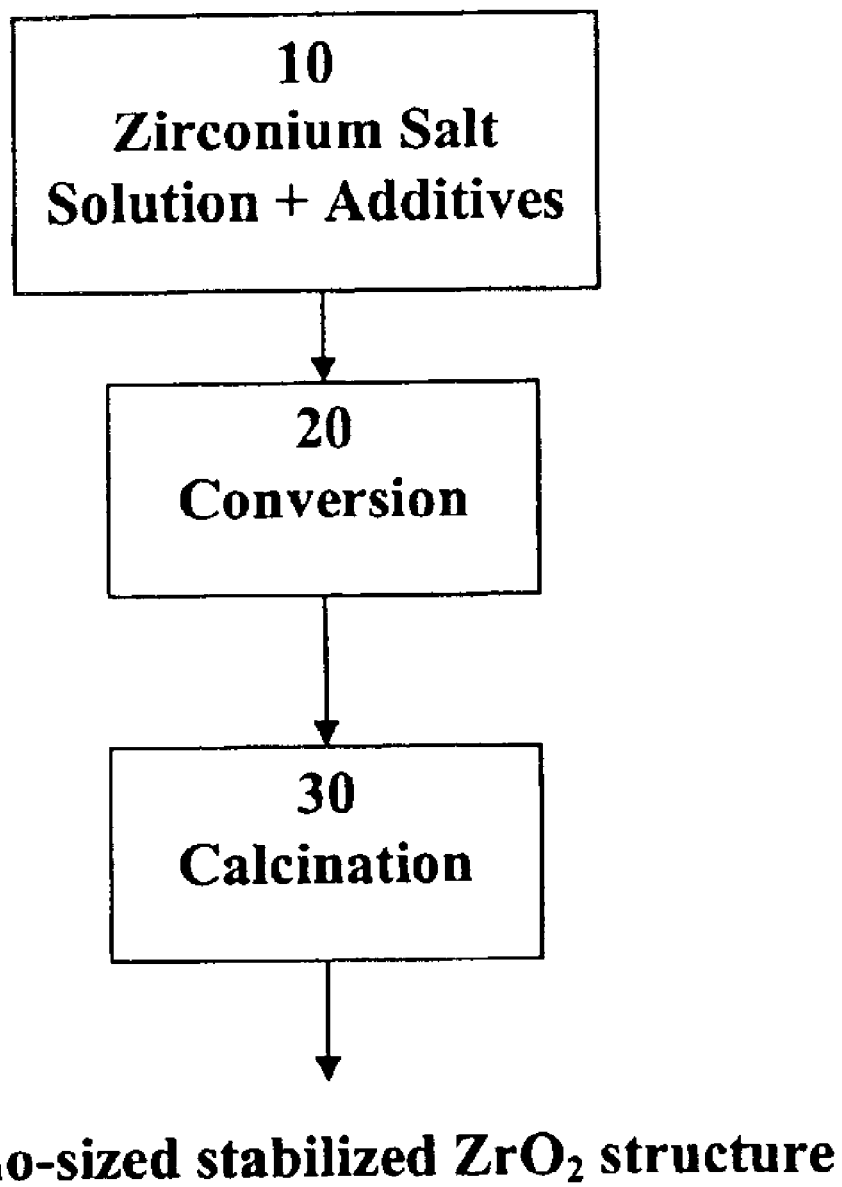
FIG. 1 provides a flow sheet of one embodiment of the process according to the present invention.

Referring to FIG. 1, the general process according to the invention is shown. A starting or aqueous feed solution 10 is comprised of water, an acid, a zirconium salt, and a stabilizing agent. The feed solution is free of insoluble or precipitated material.

The acid may be selected from the group consisting of sulfuric, hydrochloric, and nitric acid. Preferably, the acid is hydrochloric acid. The amount of acid present in the starting solution is at least equal to the amount needed to avoid spontaneous hydrolysis of the zirconium in solution. It may, however, be desirable to provide an excess of acid. For example, when the acid is HCL and the zirconium salt is zirconium oxychloride, the amount of excess acid may vary over a wide range, but is generally less than an amount to provide an excess of about 150 g/l Cl.

The type zirconium salt is not particularly limited so long as it is water-soluble. Accordingly, the zirconium salt includes zirconium oxysulfate, zirconium oxychloride, zirconium oxynitrate, zirconium nitrate, and other water-soluble zirconium salts. Preferably, zirconium oxychloride is used.

The stabilizing agent can be any water soluble element that can impart structural stability to zirconium dioxide. The stabilizing agent is preferably selected from the group of metals consisting of calcium, magnesium, yttrium, cerium and rare earth oxides. Generally, the metals are provided as metal chlorides or metal oxides.

The starting solution is converted to an amorphous solid intermediate in a conversion process step 20 that involves substantially total, controlled evaporation of the solution and the formation of a thin amorphous film. This process is conducted above the boiling point of the solution but below the temperature where there is significant crystal growth. The water and acid are vaporized and the acid may be recovered by any known process.

The conversion process step is performed in a manner to control the physical form of the amorphous intermediate. Preferably, the conversion process step includes the substantially total evaporation of the solution and hydrolysis of the product resulting from the substantially complete evaporation. The conversion step also preferably successively evaporates part of the feed solution, hydrolyzes the zirconium in solution, and substantially evaporates the remainder of the solution. In a preferred embodiment, the conversion process is conducted using a spray hydrolysis process.

In the preferred spray hydrolysis process, hydrolysis is accomplished by spraying the solution while it is heated at a temperature in the range from about 120° C. to about 350° C., preferably in the range from about 200° to about 250° C. Spray hydrolysis may be effected in a spray dryer.

Through control of the operating parameters, including temperature and chemical composition of the starting solution, the characteristics of the solid amorphous intermediate can be reliably controlled within a fairly narrow range. For example, the amorphous intermediate resulting from spray hydrolysis in a spray dryer will be composed of amorphous, hollow, thin-filmed spheres or parts of spheres. The dimensions of the spheres may vary over a wide range, from less than 1 μm to 100 μm in diameter, and the shell thickness in the range from about 30 nm to about 1000 nm. The shells comprise an amorphous, hydrated zirconium oxide containing residual chloride.

Without being bound by any theory, it is believed that spray hydrolysis under the conditions described above produces spheres composed of a thin film of an amorphous solid that can readily be converted to nano-sized stabilized $ZrO_2$. Spray hydrolysis also has the advantage of direct processing of the solution so that the formation of the desired amorphous product and the evaporation of water and HCl are simultaneously accomplished.

The amorphous intermediate zirconia compound resulting from spray hydrolysis is calcined 30 at a temperature and for a length of time sufficient to convert the amorphous zirconia to zirconium dioxide of the desired crystal structure, namely $ZrO_2$ stabilized in the cubic or tetragonal form by inclusion of yttrium, calcium, magnesium, or rare earth oxides.

Calcination temperatures can range between about 400° and about 1300° C. Preferably, the calcination is conducted at temperatures ranging from about 600° to 1000° C. The calcination time varies over a wide range, from about 1 h to about 24 h. Lower temperatures will require longer calcination times.

The product of calcination is a thin film having a structure of individual units that can be broken into particles of the desired median size and distribution.

If the starting solution is a chloride solution, any residual chloride in the amorphous zirconia compound resulting from spray hydrolysis is expelled during calcination as HCl gas that can be recovered.

Depending on the intended application, the product of calcination can be further processed by pressing and sintering, for example to make three-dimensional structures, or by milling and particle classification, to produce powders for thermal spraying. Milled particles can also be further processed, for example by tape casting, to make electrolyte structures for solid oxide fuel cells.

Figure 2:
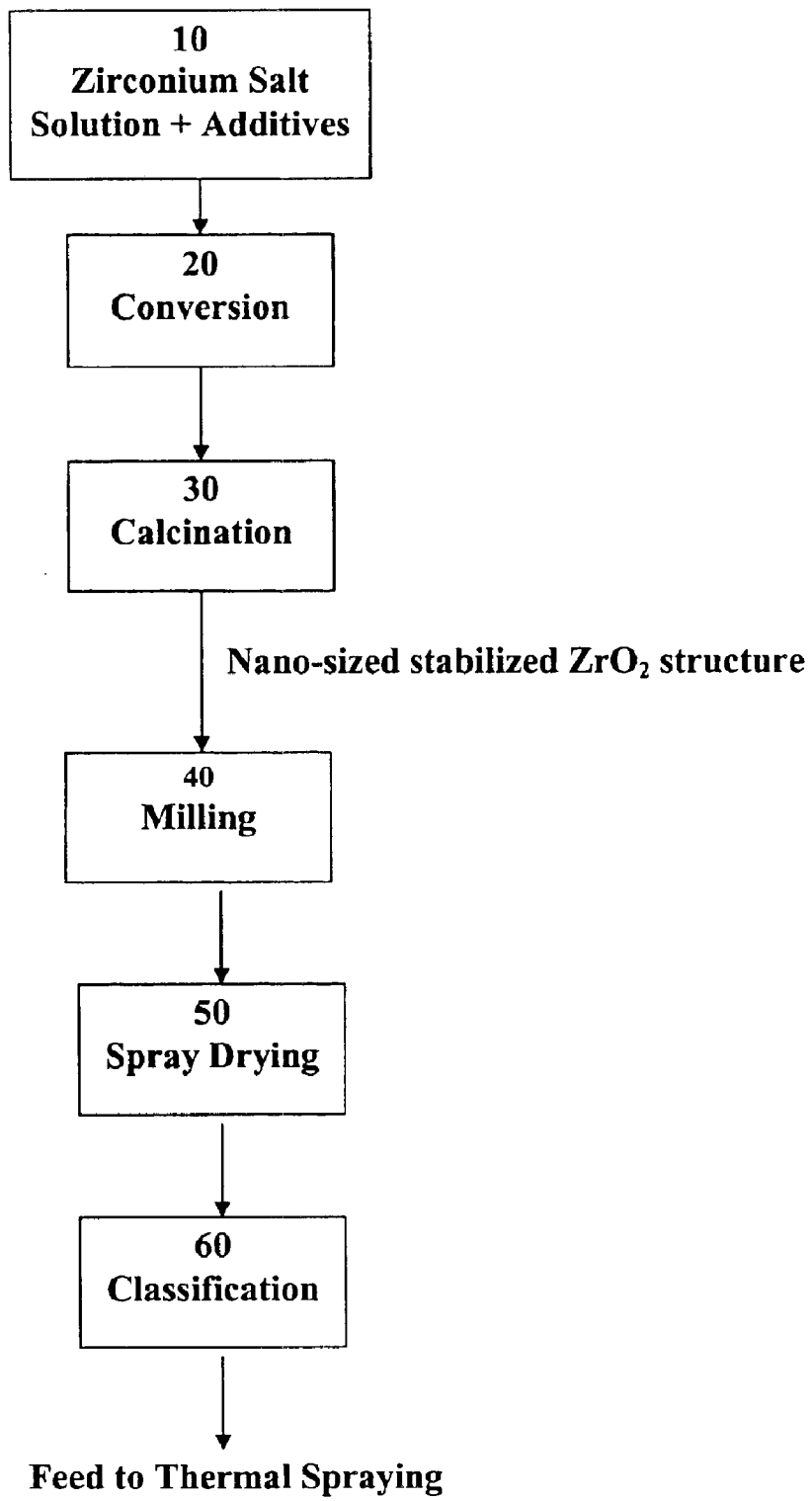
FIG. 2 provides a flow sheet to another embodiment of the process according to the invention, where the final product is nano-structured feed material for a thermal spraying process.

Referring to FIG. 2, an alternative embodiment of the present invention is shown. In this embodiment, the product from calcination is milled 40. Milling can be performed by any suitable process such as by milling in water to form an aqueous slurry. The aqueous slurry can then be spray dried 50 to form weakly agglomerated nano-sized stabilized zirconia. Thereafter, the agglomerated particles can be classified 60 according to size with the appropriate size particles being used as thermal spraying powder. Before classifying, the weakly agglomerated particles may be sintered to produce a partially fused agglomerate structure.

The following examples are meant to illustrate the process of the present invention and not to limit the claims.

EXAMPLE I

Figure 3:
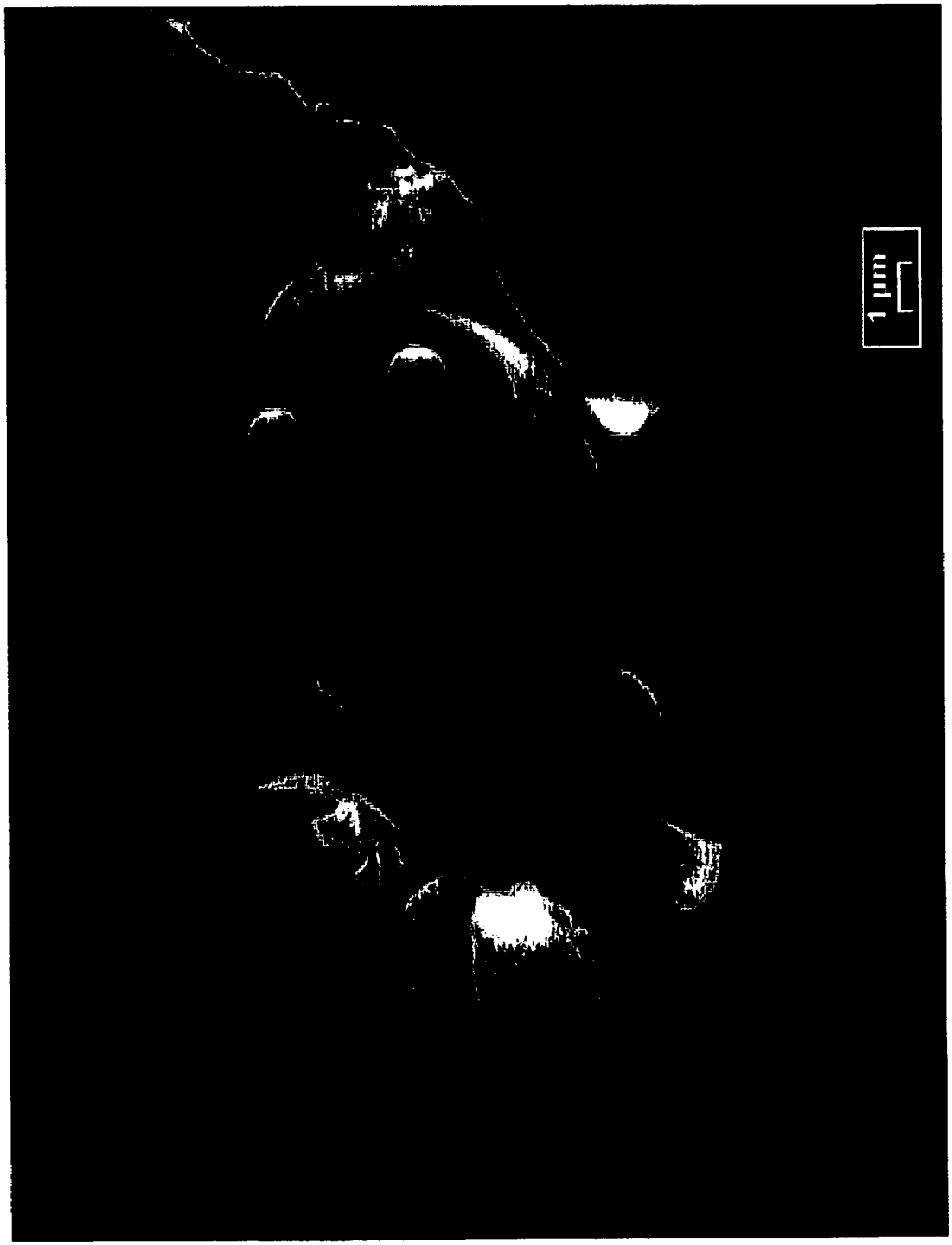
FIG. 3 is a scanning electron micrograph of the intermediate product after step 20.
Figure 4:
FIG. 4 is a scanning electron micrograph of the product of step 30, calcined at 1000° C.

Reagent grade $ZrOCl_2$ and $YCl_3$ are dissolved in a 2 M HCl solution to provide a starting solution containing 39 g/l Zr and 7 g/l Y. The solution is injected through the nozzle of a spray dryer. The spray dryer has a titanium chamber, the air inlet temperature is about 600° C. and the outlet is about 250° C. The injection process substantially completely evaporates the solution, hydrolyzes the material, and forms an amorphous intermediate product, which is recovered in a cyclone. The intermediate product is dry and amorphous. The loss on ignition when this product is heated to 800° C. is about 25%. FIG. 3 is an electron micrograph of this intermediate product. This product is further calcined at 1000° C. for 6 h. The resulting crystal has 100% cubic structure. FIG. 4 is an electron micrograph of this product, showing part of a spherical shell with a thickness of about 450 nm and individual particles of about 100 nm in size.

EXAMPLE II

Figure 5:
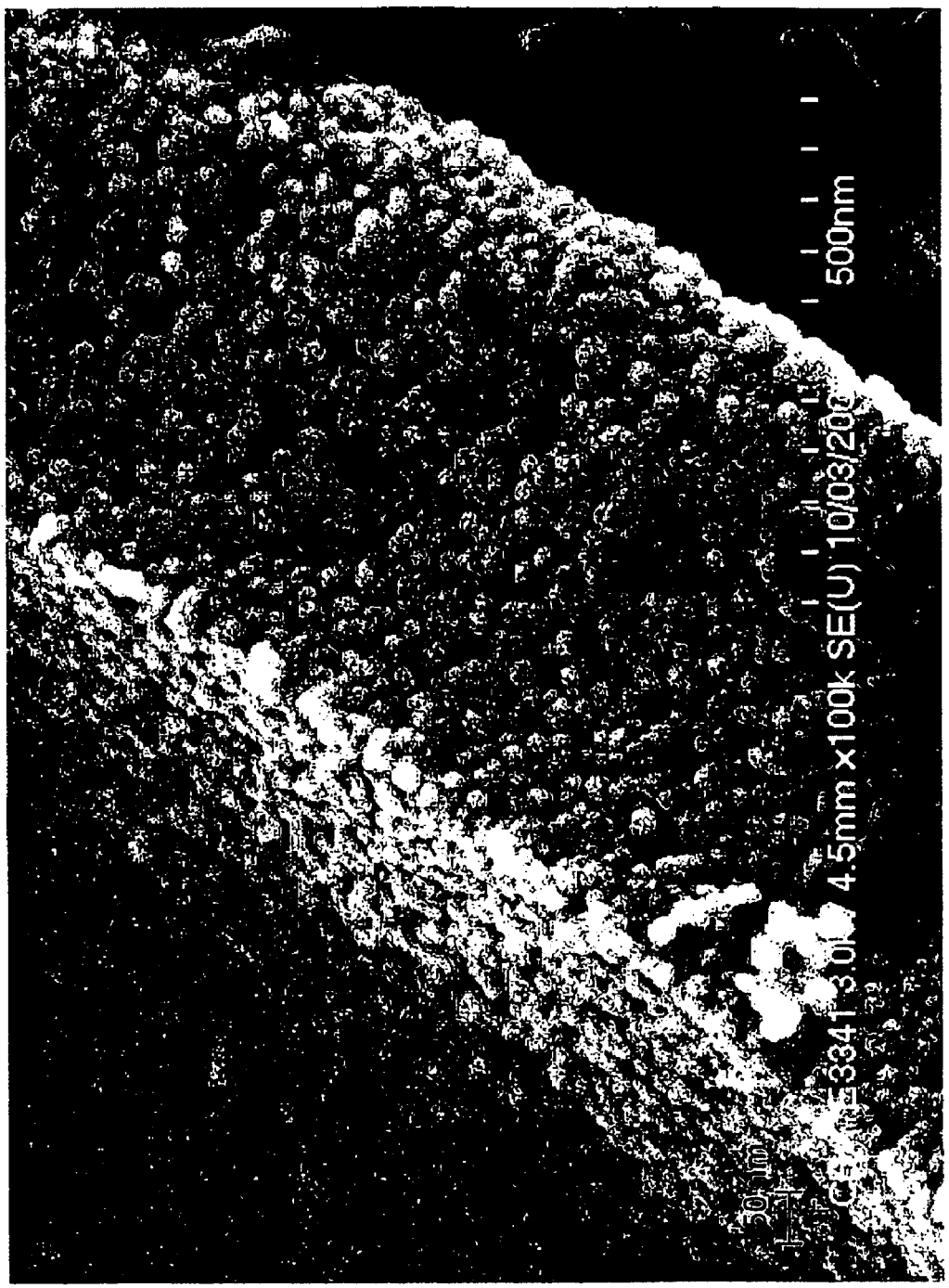
FIG. 5 is a scanning electron micrograph of the product of step 30, calcined at 700° C.

Reagent grade $ZrOCl_2$ and $CaCl_2.2H_2O$ are dissolved in a 2 M HCl solution to provide a starting solution containing 44 g/l Zr and 1 g/l Ca. The solution is injected through the nozzle of a spray dryer. The spray dryer has a titanium chamber, the air inlet temperature is about 600° C. and the outlet is about 250° C. The injection process substantially completely evaporates the solution, hydrolyzes the material, and forms an amorphous intermediate product, which is recovered in a cyclone. The intermediate product is dry and amorphous. The loss on ignition when this product is heated to 800° C. is about 20%. This powder is further calcined at 700° C. for 6 h. The resulting crystal has 100% cubic structure. FIG. 5 is an electron micrograph of this product, showing part of a spherical shell with a thickness of about 600 nm and individual particles of about 30 nm in size.

EXAMPLE III

A solution of Zr oxychloride and yttrium chloride is prepared as in example I. The solution is treated in a spray dryer in the same conditions as in example I. The resulting powder is calcined at 600° C. for 4 h. The calcined powder is milled in water to produce an aqueous slurry. Next, the aqueous slurry is spray-dried, producing weakly agglomerated nano-sized zirconia. Next, the agglomerates of nano-sized zirconia are sintered at 1000° C. for 1 h to produce a partially fused agglomerate structure. The partially fused agglomerates still have a broad distribution of agglomerate sizes. The broad distribution of agglomerate sizes is narrowed in an air classifier to separate the size fraction 15 to 50 $\mu$m. The larger and smaller size fractions are recycled. This classified product can be used as a nano-structured thermal spraying powder.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed:

1. A process for producing nano-sized stabilized zirconium dioxide that comprises:
   a. providing an aqueous solution that includes a zirconium salt and a stabilizing agent;
   b. hydrolyzing the solution to form an intermediate and hydrochloric acid and to remove water, wherein the hydrolyzing is conducted in a controlled temperature, substantially total evaporation process at a temperature higher than the boiling point of the solution but lower than the temperature where there is significant crystal growth; and,
   c. calcining the intermediate to form nano-sized agglomerates.

2. The process of claim 1 wherein the zirconium salt is zirconium oxychloride.

3. The process of claim 1 wherein the stabilizing agent is selected from the group consisting of yttrium chloride, cerium chloride, calcium chloride, magnesium chloride, and mixtures thereof.

4. The process of claim 1 wherein the hydrolyzing is effected in a spray dryer.

5. The process of claim 4 wherein the spray dryer temperature is between about 120° C. and about 350° C.

6. The process of claim 1 wherein the intermediate comprises a thin film of amorphous zirconia.

7. The process of claim 6 wherein the amorphous zirconia comprises spheres or parts of spheres with thin membranes having a diameter between about 1 and about 100 $\mu$m and a membrane thickness between about 30 nm and about 1000 nm.

8. The process of claim 1 wherein the calcining is conducted at a temperature between about 400° C. and about 1300° C.

9. A process for producing nano-sized stabilized zirconium dioxide that comprises:
   a. providing an aqueous solution that includes a zirconium salt and a stabilizing agent;
   b. hydrolyzing the solution to form an intermediate, wherein the hydrolyzing is conducted in a controlled temperature, substantially total evaporation process at a temperature higher than the boiling point of the solution but lower than the temperature where there is significant crystal growth, and wherein the intermediate comprises amorphous zirconia that is comprised of spheres or parts of spheres with thin membranes having a diameter between about 1 and about 100 $\mu$m and a membrane thickness between about 30 nm and about 1000 nm; and,
   c. calcining the intermediate to form nano-sized agglomerates.

10. The process of claim 9 wherein the zirconium salt is selected from the group consisting of zirconium oxysulfate, zirconium oxychloride, zirconium nitrate, and a water-soluble stabilizing agent.

11. The process of claim 9 wherein the stabilizing agent is selected from the group consisting of yttrium chloride, cerium chloride, calcium chloride, magnesium chloride, and rare earth oxides.

12. The process of claim 9 wherein the hydrolyzing is effected in a spray dryer.

13. The process of claim 12 wherein the spray dryer temperature is between about 120° C. and about 350° C.

14. The process of claim 9 wherein the calcining is conducted at a temperature between about 400° C. and about 1300° C.

* * * * *